US012811706B2

(12) United States Patent
Dou et al.

(10) Patent No.: US 12,811,706 B2
(45) Date of Patent: Nov. 24, 2026

(54) SPECTRUM ADJUSTMENT METHOD FOR OPTICAL TRANSMISSION SYSTEM AND NETWORK MANAGEMENT SYSTEM

(71) Applicant: Cloud Intelligence Assets Holding (Singapore) Private Limited, Singapore (SG)

(72) Inventors: Liang Dou, Beijing (CN); Boyuan Yan, Hangzhou (CN); Chongjin Xie, Hangzhou (CN)

(73) Assignee: Cloud Intelligence Assets Holding (Singapore) Private Limited, Singapore (SG)

( * ) Notice: Subject to any disclaimer, the term of this patent is extended or adjusted under 35 U.S.C. 154(b) by 160 days.

(21) Appl. No.: 18/704,863

(22) PCT Filed: Jan. 29, 2023

(86) PCT No.: PCT/CN2023/073726
§ 371 (c)(1),
(2) Date: Apr. 25, 2024

(87) PCT Pub. No.: WO2023/143580
PCT Pub. Date: Aug. 3, 2023

(65) Prior Publication Data
US 2024/0421933 A1 Dec. 19, 2024

(30) Foreign Application Priority Data
Jan. 30, 2022 (CN) ........................ 202210113395.0

(51) Int. Cl.
*H04J 14/02* (2006.01)

(52) U.S. Cl.
CPC ...... *H04J 14/0202* (2013.01); *H04J 14/0227* (2013.01)

(58) Field of Classification Search
CPC ........ H04J 1/04; H04J 1/02; H04J 3/02; H04J 3/06; H04J 3/24; H04J 7/02; H04J 13/10;
(Continued)

(56) References Cited

U.S. PATENT DOCUMENTS 7,092,642 B2 * 8/2006 Way .................... H04J 14/0246 398/192
10,873,411 B1 12/2020 Marenco et al.
(Continued)

FOREIGN PATENT DOCUMENTS

CN 102893630 A 1/2013
CN 103547338 A 1/2014
(Continued)

OTHER PUBLICATIONS

M. Imran et al. ,"A programmable optical few wavelength source for flexgrid optical networks," Apr. 21, 2016,Optical Fiber Technology 30 (2016), pp. 100-109.*
(Continued)

*Primary Examiner* — Omar S Ismail
(74) *Attorney, Agent, or Firm* — Osha Bergman Watanabe & Burton LLP

(57) ABSTRACT

The present disclosure relates to a spectrum adjustment method for an optical transmission system and a network management system. Taking a goal of providing at least one available idle frequency band for a first wavelength channel desired to be created, a spectrum adjustment scheme is generated based on frequency band information of a wavelength channel currently used by a transmitting-end and receiving-end device corresponding to the first wavelength channel in the optical transmission system, where the spectrum adjustment scheme is used to characterize frequency band adjustment information of the wavelength channel that needs to be adjusted. An adjustment instruction is sent to the
(Continued)

transmitting-end and receiving-end device based on the spectrum adjustment scheme. Thus, the optimization of spectrum resources can be realized based on the generated spectrum adjustment scheme, thereby providing support for the creation of the first wavelength channel.

16 Claims, 6 Drawing Sheets

(58) Field of Classification Search
CPC .. H04J 13/16; H04J 13/18; H04J 14/02; H04J 14/04; H04J 14/06; H04J 14/08
See application file for complete search history.

(56) References Cited

U.S. PATENT DOCUMENTS

| | | | | |
|---|---|---|---|---|
| 2002/0012495 | A1* | 1/2002 | Sasai | H04B 10/25754 385/24 |
| 2002/0021464 | A1* | 2/2002 | Way | H04J 14/0305 398/79 |
| 2005/0018331 | A1* | 1/2005 | Pautet | G02B 26/001 359/885 |
| 2010/0150550 | A1* | 6/2010 | Hashimoto | H04B 10/5165 398/79 |
| 2010/0178057 | A1* | 7/2010 | Shieh | H04L 25/0242 398/79 |
| 2011/0033182 | A1* | 2/2011 | Haunstein | H04B 10/6161 398/26 |
| 2011/0311222 | A1* | 12/2011 | Nakamura | H04B 10/07953 398/26 |
| 2012/0141130 | A1* | 6/2012 | Nakashima | H04B 10/572 398/187 |
| 2012/0195593 | A1* | 8/2012 | Bernasconi | H04B 10/07 398/48 |
| 2013/0089324 | A1* | 4/2013 | Eiselt | H04B 10/40 398/34 |
| 2013/0272710 | A1 | 10/2013 | Wang et al. | |
| 2015/0333863 | A1* | 11/2015 | Fujita | H04B 10/506 398/34 |
| 2015/0382087 | A1 | 12/2015 | Dugan | |
| 2016/0204876 | A1* | 7/2016 | Kamura | H04J 14/0227 398/79 |
| 2016/0204877 | A1* | 7/2016 | Brooks | H04B 10/29 398/208 |
| 2017/0104535 | A1 | 4/2017 | Hoshida | |
| 2017/0214461 | A1* | 7/2017 | Yamauchi | H04J 14/0257 |
| 2017/0264371 | A1* | 9/2017 | Fukui | H04J 14/0307 |
| 2017/0353243 | A1* | 12/2017 | Brueckheimer | H04B 10/0793 |
| 2018/0234199 | A1* | 8/2018 | Bouda | H04B 10/572 |
| 2018/0343059 | A1* | 11/2018 | Harley | H04B 10/25891 |
| 2018/0343078 | A1* | 11/2018 | Roberts | H04B 10/0793 |
| 2019/0109644 | A1 | 4/2019 | Eira et al. | |
| 2020/0036446 | A1* | 1/2020 | Ge | H04B 10/075 |
| 2020/0076526 | A1* | 3/2020 | Winzer | G02B 5/20 |
| 2022/0070559 | A1* | 3/2022 | Liu | H04J 14/0256 |
| 2022/0329319 | A1* | 10/2022 | Hasegawa | H04B 10/07953 |
| 2023/0327762 | A1* | 10/2023 | Buset | H04B 10/2537 398/147 |

FOREIGN PATENT DOCUMENTS

| | | | |
|---|---|---|---|
| CN | 105745940 | A | 7/2016 |
| CN | 108737031 | A | 11/2018 |
| CN | 109151830 | A | 1/2019 |
| CN | 110769335 | A | 2/2020 |
| CN | 111385680 | A | 7/2020 |
| CN | 111836135 | A | 10/2020 |
| CN | 113055767 | A | 6/2021 |
| CN | 114554323 | A | 5/2022 |
| KR | 20190046519 | A | 5/2019 |

OTHER PUBLICATIONS

André Luiz Aguiar da Costa et al., "Effects of all-optical wavelength conversion on signalquality under variable-channel spacing in elastic optical networks," Jun. 22, 2020, Optical Engineering, Jun. 2020, vol. 59( 6) , pp. 066104-1-066104-7.*
Thierry Zami,"Current and Future Flexible Wavelength Routing Cross-Connects," , Bell Labs Technical Journal 18(3), 23-38 (2013), pp. 25-33.*
Caglar Tunc et al., "Mapping time-varying IP traffic to flexible optical paths in flexgrid optical networks," Aug. 28, 2014, Photon Netw Commun (2015) 29, pp. 67-70.*
Bijoy Chand Chatterjee et al.,"Routing and Spectrum Allocation in Elastic Optical Networks: A Tutorial," Aug. 20, 2015, IEEE Communication Surveys & Tutorials, vol. 17, No. 3, Third Quarter 2015, pp. 1776-1796.*
Notification to Grant Patent Right for Invention dated Apr. 28, 2024 for Chinese Application No. 202210113395.0.
Liyazhou hu "Thesis for Master Degree—Research on Defragmentation Technology Based on Spectrum Compactness in Multi-dimensional Optical Network" Jun. 6, 2019, pp. 1-68, Beijing University of Posts and Telecommunications.
International Search Report dated Mar. 24, 2023 for Application No. PCT/CN2023/073726.
The First Examination Opinion dated Dec. 6, 2023 from National Intellectual Property Administration, PRC for Application No. 2022101133950.
Bokai Cheng et al. "Defragmentation algorithm based on resource saving strategy for elastic optical networks" 2020, 44(3), pp. 45-48.

* cited by examiner

SPECTRUM ADJUSTMENT METHOD FOR OPTICAL TRANSMISSION SYSTEM AND NETWORK MANAGEMENT SYSTEM

CROSS-REFERENCE TO RELATED APPLICATIONS

The present application is a National Stage of International Application No. PCT/CN2023/073726, filed on Jan. 29, 2023, which claims priority to Chinese Patent Application No. 202210113395.0, entitled "SPECTRUM ADJUSTMENT METHOD FOR OPTICAL TRANSMISSION SYSTEM AND NETWORK MANAGEMENT SYSTEM", and filed with the China National Intellectual Property Administration on Jan. 30, 2022. These applications are hereby incorporated by reference in their entireties.

TECHNICAL FIELD

The present disclosure relates to the field of optical transmission technologies and, in particular, to a spectrum adjustment method for an optical transmission system, and a network management system.

BACKGROUND

With the evolution and improvement of the baud rate of optical transmission transceivers, a variety of devices with different baud rates may coexist in a same optical transmission system, which requires optical-layer devices in the optical transmission system to support a flexgrid attribute to facilitate the access of electrical-layer devices with various bandwidth requirements. Relevant standard protocols specify channel widths that can be created in flexgrid systems. For example, ITU-T 698.1 specifies that the channel widths in the flexgrid systems are an integer multiple of 12.5 GHz.

In the optical transmission system, as a channel goes online and offline, discrete fragmented spectrums may appear on an originally continuous spectrum. Since the widths of the fragments are related to the width of a channel when it is initially created, when the channel is subsequently allocated, there may be a scenario where the total amount of vacant spectrums exceeds a requested channel width but each individual spectrum fragment cannot meet the bandwidth requirement. There is no doubt that this may significantly reduce spectrum utilization.

Therefore, a solution that can improve the spectrum utilization of the optical transmission system is needed.

SUMMARY

A technical problem to be solved by the present disclosure is to provide a spectrum adjustment solution that can improve the spectrum utilization of an optical transmission system.

According to a first aspect of the present disclosure, a spectrum adjustment method is provided, including: taking a goal of providing at least one available idle frequency band for a first wavelength channel desired to be created, generating a spectrum adjustment scheme based on frequency band information of a second wavelength channel currently used by a transmitting-end and receiving-end device corresponding to the first wavelength channel in an optical transmission system, where the spectrum adjustment scheme is used to characterize frequency band adjustment information of a second wavelength channel that needs to be adjusted; sending an adjustment instruction to the transmitting-end and receiving-end device based on the spectrum adjustment scheme.

In an implementation, the step of generating the spectrum adjustment scheme includes: determining whether a frequency band width of the first wavelength channel is greater than a sum of widths of all unused frequency bands; if the frequency band width of the first wavelength channel is less than or equal to the sum of the widths of all the unused frequency bands, determining whether the frequency band width of the first wavelength channel is less than or equal to a largest frequency band width of the unused frequency bands; if the frequency band width of the first wavelength channel is greater than the largest frequency band width of the unused frequency bands, for each frequency band in at least part of the unused frequency bands, taking a goal of expanding the respective frequency band to a frequency band of the first wavelength channel, generating the spectrum adjustment scheme corresponding to the respective frequency band.

In an implementation, the method further includes: determining feasibility of the spectrum adjustment scheme based on an adjustment capability of the transmitting-end and receiving-end device, and eliminating an unfeasible spectrum adjustment scheme; and/or determining whether the spectrum adjustment scheme meets a pre-entered constraint condition, and eliminating a spectrum adjustment scheme that does not meet the constraint condition.

In an implementation, the method further includes: performing index evaluation on a retained spectrum adjustment scheme, where an evaluated index includes an amount of the to-be-adjusted second wavelength channel and/or a sum of a to-be-adjusted frequency of the to-be-adjusted second wavelength channel involved in the retained spectrum adjustment scheme; selecting a spectrum adjustment scheme from the retained spectrum adjustment schemes based on an index evaluation result.

In an implementation, the method further includes: obtaining intention information, where the intention information includes at least one of identification information of the transmitting-end and receiving-end device, a transmission rate of the first wavelength channel, and a frequency band width of the first wavelength channel; and/or obtaining constraint information, where the constraint information includes at least one of a frequency band interval of the first wavelength channel, a priority of a frequency band where the first wavelength channel is located, a maximum value of a frequency band of the to-be-adjusted second wavelength channel involved in the spectrum adjustment scheme, a maximum frequency value of an adjustment step involved when the spectrum adjustment scheme is executed, and an adjustment range of a center frequency of a laser of the transmitting-end and receiving-end device, where the step of generating the spectrum adjustment scheme includes: generating the spectrum adjustment scheme based on the frequency band information of the second wavelength channel currently used by the transmitting-end and receiving-end device, the intention information and/or the constraint information.

In an implementation, the step of sending the adjustment instruction to the transmitting-end and receiving-end device based on the spectrum adjustment scheme includes: sending a first instruction for expanding a frequency band width of the second wavelength channel to the transmitting-end and receiving-end device; in response to receiving a message that the first instruction is executed successfully, sending a second instruction for adjusting a laser frequency to the transmitting-end and receiving-end device to prompt the transmitting-end and receiving-end device to adjust the laser frequency to a target value; and sending a third instruction for reducing the frequency band width of the second wavelength channel to a pre-adjustment frequency band width to the transmitting-end and receiving-end device after the transmitting-end and receiving-end device adjust the laser frequency to the target value.

In an implementation, the step of sending the second instruction for adjusting the laser frequency to the transmitting-end and receiving-end device includes: sending the second instruction to a first electrical-layer device located at a transmitting-end and a second electrical-layer device located at a receiving-end, of the transmitting-end and receiving-end device respectively, where an adjustment range of the laser frequency characterized by the second instruction does not exceed a first value; sending, after both the first electrical-layer device and the second electrical-layer device have executed the second instruction, the second instructions to the first electrical-layer device and the second electrical-layer device respectively again until both the first electrical-layer device and the second electrical-layer device have the laser frequency adjusted to the target value.

According to a second aspect of the present disclosure, a spectrum adjustment method for an optical transmission system is provided, including: expanding a frequency band width of a wavelength channel currently used, based on frequency band adjustment information of the wavelength channel that is characterized by a spectrum adjustment scheme; adjusting a laser frequency in a transmitting-end and receiving-end device corresponding to the wavelength channel so that a frequency of an optical signal emitted by an adjusted laser is within a frequency band range of the adjusted wavelength channel; and reducing the frequency band width of the wavelength channel to a pre-adjustment frequency band width.

In an implementation, the step of adjusting the laser frequency in the transmitting-end and receiving-end device corresponding to the wavelength channel includes: adjusting the laser frequency in the transmitting-end and receiving-end device to a target value through one or more adjustments, so that the frequency the optical signal emitted by the respective laser in the transmitting-end and receiving-end device is within the frequency band range of the adjusted wavelength channel, where an adjustment range of a center frequency in the transmitting-end and receiving-end device in each adjustment process does not exceed a first value, and a next round of adjustment is performed after both of a first electrical-layer device located at a transmitting-end and a second electrical-layer device located at a receiving-end, of the transmitting-end and receiving-end device perform an adjustment of the laser frequency.

According to a third aspect of the present disclosure, a network management system is provided, including a spectrum adjustment scheme generating module, an instruction generating module, and a communication module, where the spectrum adjustment module is configured to: take a goal of providing at least one available idle frequency band for a first wavelength channel desired to be created, generate a spectrum adjustment scheme based on frequency band information of a second wavelength channel currently used by a transmitting-end and receiving-end device corresponding to the first wavelength channel in an optical transmission system, where the spectrum adjustment scheme is used to characterize frequency band adjustment information of a second wavelength channel that needs to be adjusted; the instruction generating module is configured to generate an adjustment instruction for execution by the transmitting-end and receiving-end device based on the spectrum adjustment scheme; the communication module is configured to send the adjustment instructions to the transmitting-end and receiving-end device.

According to a fourth aspect of the present disclosure, a computing device is provided, including: a processor; and a memory, which stores thereon executable codes, where when the executable codes are executed by the processor, the processor is caused to execute the method according to the first aspect or the second aspect.

According to a fifth aspect of the present disclosure, a computer program product is provided, including executable codes, where when the executable codes are executed by a processor of an electronic device, the processor is caused to execute the method according to the first aspect or the second aspect.

According to a sixth aspect of the present disclosure, a non-transitory machine-readable storage medium is provided, which stores thereon executable codes, where when the executable codes are executed by a processor of an electronic device, the processor is caused to execute the method according to the first aspect or the second aspect.

Therefore, in the present disclosure, by generating the spectrum adjustment scheme based on the frequency band information of the second wavelength channel currently used by the transmitting-end and receiving-end device, and sending the adjustment instruction to the transmitting-end and receiving-end device based on the spectrum adjustment scheme, the optimization of spectrum resources can be realized, thereby providing support for the creation of the first wavelength channel.

BRIEF DESCRIPTION OF DRAWINGS

The above-mentioned and other purposes, features, and advantages of the present disclosure will become more apparent by describing the exemplary implementations of the present disclosure in more detail with reference to the accompanying drawings. In the exemplary embodiments of the present disclosure, the same reference signs generally refer to the same components.

DESCRIPTION OF EMBODIMENTS

Figure 1:
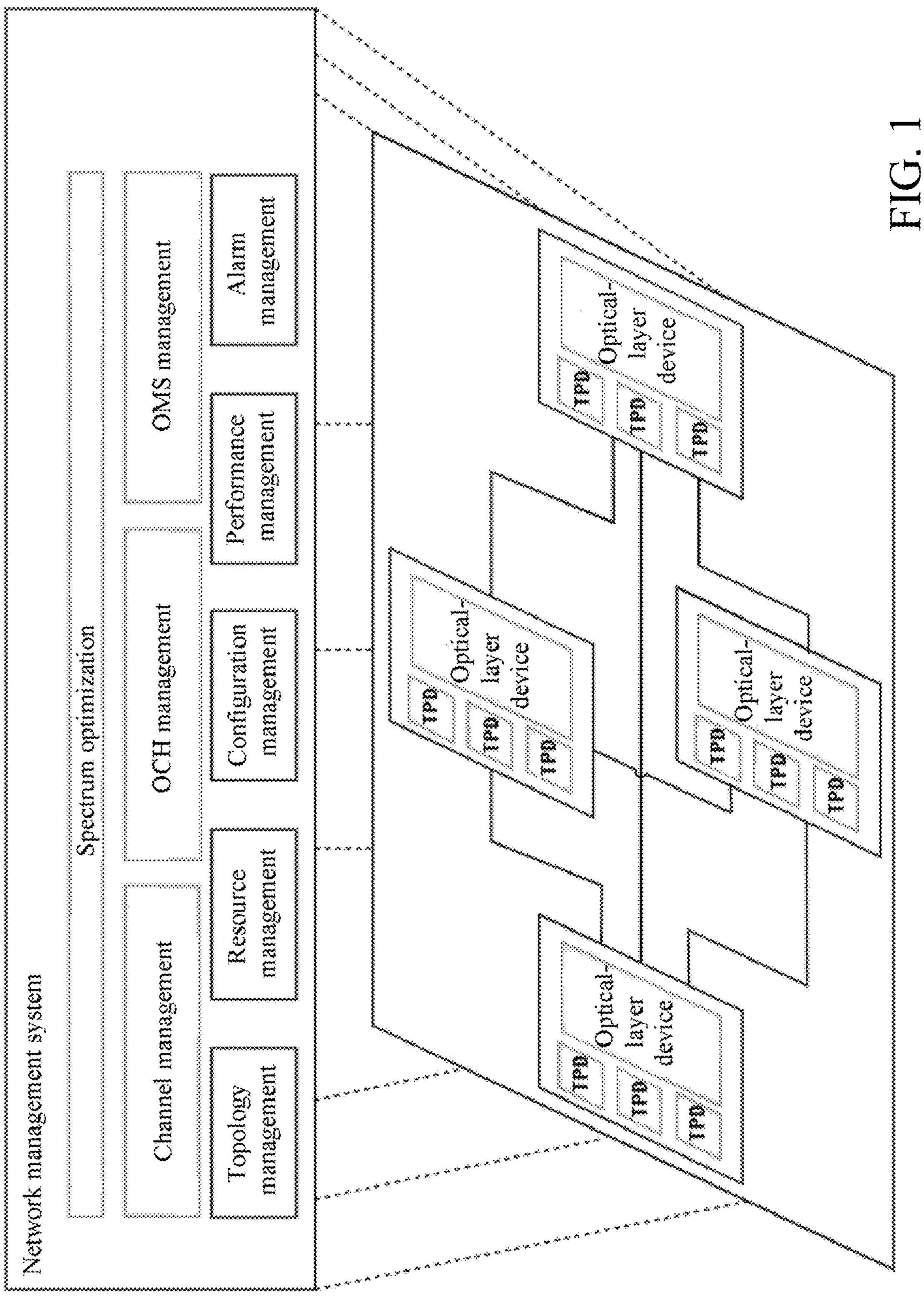
FIG. 1 shows a schematic diagram of a typical structure of an optical transmission system equipped with a spectrum adjustment method of the present disclosure.

Preferred implementations of the present disclosure will be described in more detail below with reference to the accompanying drawings. Although preferred implementations of the present disclosure are shown in the drawings, it should be understood that the present disclosure may be embodied in various forms and should not be limited to the implementations set forth herein. Rather, these implementations are provided so that the present disclosure will be thorough and complete, and the scope of the present disclosure can be fully conveyed to those skilled in the art.

The present disclosure proposes a spectrum adjustment method applicable to an optical transmission system.

The optical transmission system refers to a communication system that uses optical signals to transmit information. The optical transmission system can be of a point-to-point transmission network topology structure or a Mesh network structure. When the optical transmission system is of the Mesh network structure, the spectrum adjustment method of the present disclosure can also be combined with routing algorithms to achieve optimization (i.e., adjustment) of the two dimensions of spectrum and routing.

FIG. 1 shows a schematic diagram of a typical structure of an optical transmission system equipped with a spectrum adjustment method of the present disclosure.

The optical transmission system can include a plurality of optical transmission devices and a network management system (NMS). The plurality of optical transmission devices can form a transmission network (i.e., an optical network) that uses optical signals to transmit information. The transmission network can be an optical network (such as an all-optical network) based on wavelength division multiplexing. Each optical transmission device can be regarded as anode in the transmission network and is distributed at a corresponding site.

As an example, the optical transmission device can be implemented as an optical-electrical layered structure. As shown in FIG. 1, a block part composed of an optical-layer device (Optical Line Device) and an electrical-layer device (Transponder, TPD) is the optical transmission device.

The optical transmission device can include an optical-layer device and one or more electrical-layer devices. The electrical-layer device is responsible for converting signals from data communication devices (a switch, a router, and so on) into optical signals. For example, the electrical-layer device can produce an optical signal by controlling a frequency (such as center frequency) of light emitted by a laser. The optical-layer device is responsible for transmitting the optical signal produced by the electrical-layer device.

An electrical-layer device located at a transmitting-end of the optical transmission network can produce one or more optical signals by controlling the frequency of light emitted by the laser. The optical-layer device can include functional modules for multiplexing, amplification, equalization, and demultiplexing, etc. An optical-layer device located at the transmitting-end can multiplex a variety of optical signals generated by the electrical-layer device, and the multiplexed optical signals can be amplified and then transmitted in the same optical fiber. Multipath signals can be transmitted on one optical fiber, and a signal for each path is transmitted by light with a certain specific wavelength. A transmission path of the signal with a specific wavelength is called a wavelength channel. After receiving an optical signal, an optical-layer device at a receiving-end can perform pre-amplification and demultiplexing on the received optical signal, and then an electrical-layer device controls a laser to produce a same optical signal.

As an example, the optical-layer device can use a multiplexing and demultiplexing unit that supports Flexgrid, that is, a Flexgrid optical multiplexing and demultiplexing unit (Flex Mux and Demux, FMD). Flexgrid refers to flexible grid technologies. Corresponding to fixed grid technologies, the Flexgrid technologies can flexibly adjust the widths of wavelength channels in wavelength division multiplexing systems for adapting to optical wavelength channels with different spectrum widths. The optical-layer device can be composed of a multi-port coupler, or a multi-port wavelength selective switch (WSS), or a combination of the coupler and the WSS.

The NMS can also be called network management. The optical transmission system composed of the optical transmission devices (that is, optical-layer device and electrical-layer device) can be uniformly managed by the NMS. The NMS can interact with devices through one or more protocols, such as Netconf, Restconf, SNMP (Simple Network Management Protocol), etc. The NMS can contain therein a plurality of management levels, where the lowest level can include topology management, resource management, configuration management, performance management, alarm management, and other functional management modules. On this basis, the NMS can realize the management of network-level objects, which may include for example channel management (Media Channel Management), optical channel management (OCH Management), optical multiplex section management (OMS Management), and other functional management modules.

The spectrum adjustment method proposed by the present disclosure can also be called a frequency band adjustment method. The method can serve as a functional module (e.g., a spectrum optimizing module) to be embedded in a higher layer in the NMS and play a role in the planning process of wavelength channels.

Generation of Spectrum Adjustment Scheme

As a wavelength channel (Channel) goes online and offline, discrete fragmented spectrums may appear on an originally continuous spectrum, that is, idle frequency bands may be a plurality of spectrum fragments with small frequency band widths. This results in that unused frequency bands cannot directly provide a frequency band that can meet frequency band width requirements of a first wavelength channel when a new wavelength channel (i.e., the first wavelength channel) is subsequently created. For example, when the widths of respective continuous frequency bands in the unused frequency bands are all less than the frequency band width of the first wavelength channel that needs to be created, the first wavelength channel cannot be created directly using the idle frequency band resource.

To this end, the present disclosure proposes that the NMS can take a goal of providing at least one available idle frequency band for a first wavelength channel desired to be created, and generate a spectrum adjustment scheme based on frequency band information of a wavelength channel (i.e., a second wavelength channel) currently used by a transmitting-end and receiving-end device corresponding to the first wavelength channel in an optical transmission system. The effect of optimizing spectrum resources can be achieved by executing the spectrum adjustment scheme, and therefore the spectrum adjustment scheme may also be called a spectrum optimizing scheme or spectrum optimizing strategy.

The spectrum adjustment method of the present disclosure can be executed when there is currently a need for creating the first wavelength channel, to generate the spectrum adjustment scheme that can provide an available frequency band for the first wavelength channel. The spectrum adjustment scheme of the present disclosure can also be executed when there are currently many spectrum fragments to collate the spectrum fragments and obtain a wider idle frequency band, to provide support for the subsequent creation of the first wavelength channel. In other words, the first wavelength channel in "taking the goal of providing at least one available idle frequency band for the first wavelength channel" may refer to a real channel that currently needs to be created or a virtual channel set for realizing the collation of the spectrum fragments to obtain the wider idle frequency band. The virtual channel only characterizes the need to collate out a frequency band larger than a certain width, without a need to create a new channel using the frequency band, and for example, the frequency band can be used subsequently when there is a need to create a channel.

The transmitting-end and receiving-end device includes optical transmission devices located at a signal transmitting end (such as an optical-layer device and an electrical-layer device located at the signal transmitting end) and optical transmission devices located at a signal receiving end (such as an optical-layer device and an electrical-layer device located at the signal receiving end). Currently unused frequency band(s) can be determined according to the frequency band information of the second wavelength channel currently used by the transmitting-end and receiving-end device. A total available frequency band of the transmitting-end and receiving-end device minus used frequency band(s) of the second wavelength channels is the unused frequency band, that is, the idle frequency band.

The spectrum adjustment scheme is used to characterize frequency band adjustment information of a second wavelength channel that needs to be adjusted of the second wavelength channel currently used by the transmitting-end and receiving-end device. The frequency band adjustment information mainly refers to the translation of a frequency band, that is, the movement of the frequency band without changing the frequency band width of the second wavelength channel.

When the sum of the widths of the idle frequency bands is greater than the frequency band width of the first wavelength channel that needs to be created but the widths of single continuous frequency bands of the idle frequency bands are all less than the frequency band width required by the first wavelength channel that needs to be created, idle frequency band(s) that can be used to create the first wavelength channel can be collated out by adjusting frequency band(s) of the currently used wavelength channel.

In actual application scenarios, a variety of factors, such as limited local spectrum intervals, possible risks to existing wavelength channels, time-consuming of spectrum adjustment, handling manners after abnormalities occur, and so on, need to be considered for the spectrum adjustment. In order to meet the multiple requirements mentioned above, the following information can be entered in the NMS.

1. Intention Entry

The NMS can obtain intention information, and the intention information can be entered by a user.

The intention information may be information related to the intention to open the first wavelength channel.

The intention information can include at least one of identification information of the transmitting-end and receiving-end device (such as electrical-layer devices at both transmitting-end and receiving-end) for which the first wavelength channel needs to be opened, a transmission rate of the first wavelength channel, and a frequency band width of the first wavelength channel.

As an example, the user can conduct the intention entry in accordance with the actual needs, and the entered information can mainly include: identification(s) of the electrical-layer devices at both ends (i.e., the signal transmitting end and the signal receiving end) for which the first wavelength channel needs to be opened, for example, device ID, device name, device IP address, or the like; line port identification(s) of the electrical-layer devices at the both ends the first wavelength channel needs to be opened, for example, 1/L1 identifying a first line port of a first card; the rate of the first wavelength channel that needs to be opened, such as 400 Gb/s, 600 Gb/s, 800 Gb/s, and so on; minimum spectrum width W of the first wavelength channel that needs to be opened, such as 87.5 GHz, 100 GHz, and so on.

2. Constraint Entry

The NMS can also obtain constraint information, and the constraint information can be entered by a user.

The constraint information can be used to reflect a constraint condition that needs to be considered for generating the spectrum adjustment scheme.

The constraint information may include at least one of the following: a frequency band interval of the first wavelength channel, a priority (the priority may refer to whether to prioritize starting from low frequency or high frequency when performing frequency band searching) of a frequency band where the first wavelength channel is located, a maximum value of a frequency band of the to-be-adjusted wavelength channel involved in the spectrum adjustment scheme, a maximum frequency value that can be changed or selected in an adjustment step involved when the spectrum adjustment scheme is executed, and adjustment capability/capabilities (e.g., adjustment range) of center frequency/frequencies of laser(s) of the transmitting-end and receiving-end device (e.g., the electrical-layer devices at the transmitting-end and the receiving-end).

As an example, the constraint information can include: the spectrum interval of the first wavelength channel, if there is no entry, there is no constraint on this, and selection can be made within the entire frequency band range; whether to prioritize starting from low frequency or high frequency when searching for the scheme (i.e., the spectrum adjustment scheme); the maximum number of other channels involved when searching for the scheme; the maximum value of a step involving adjustment when searching for the scheme.

The NMS can generate the spectrum adjustment scheme (which may also be called a spectrum adjustment strategy) based on the frequency band information of the second wavelength channel currently used by the transmitting-end and receiving-end device, the intention information, and/or constraint information. In the process of generating the spectrum adjustment scheme, the NMS can determine whether the spectrum adjustment scheme to be generated is feasible according to the intention information and/or constraint information, that is, whether the spectrum adjustment scheme is adapted to the intention information and/or constraint information; and unfeasible spectrum adjustment scheme(s) is abandoned, so that the generated spectrum adjustment schemes are all feasible optimization schemes. Alternatively, after generating the spectrum adjustment scheme, the NMS can determine whether the generated spectrum adjustment scheme(s) is feasible according to the intention information and/or the constraint information, and retain the feasible spectrum adjustment scheme(s).

As an example, the spectrum adjustment scheme can be generated based on the procedure as follows.

First, it can be determined whether the frequency band width of the first wavelength channel is greater than a sum of widths of all unused frequency bands. If the frequency band width of the first wavelength channel is greater than the sum of the widths of all unused frequency bands, it means that the sum of currently available frequency bands is not enough to establish the first wavelength channel, and the optimization scheme generation process can be finished or temporarily stopped (suspended), and the optimization scheme generation process is not restarted until there are enough idle frequency bands after used wavelength channel(s) is offline.

If the frequency band width of the first wavelength channel is less than or equal to the sum of the widths of all unused frequency bands, it means that the sum of the currently available frequency bands is enough to establish the first wavelength channel. At this time, it can be further determined whether the frequency band width of the first wavelength channel is less than or equal to the largest frequency band width of unused bands.

If the frequency band width of the first wavelength channel is less than or equal to the largest frequency band width of the unused frequency bands, it means that there is an idle frequency band that can be directly used to create the first wavelength channel in the currently unused frequency bands. At this time, the frequency band that can be used directly (such as the maximum frequency band) can be assigned to the first wavelength channel.

If the frequency band width of the first wavelength channel is greater than the largest frequency band width of the unused frequency bands, it means that there is no idle frequency band that can be directly used to create the first wavelength channel in the currently unused frequency bands. At this time, for each frequency band in at least part (e.g., all) of the unused frequency bands, a goal of expanding the frequency band to the frequency band of the first wavelength channel can be taken, to generate the spectrum adjustment scheme corresponding to the respective frequency band.

After the spectrum adjustment scheme(s) is generated in accordance with the procedure mentioned above, the feasibility of the spectrum adjustment scheme(s) can be determined based on an adjustment capability of the transmitting-end and receiving-end device (e.g., frequency adjustment capability of a laser, or spectrum adjustment capability of a wavelength channel), and unfeasible spectrum adjustment scheme(s) can be eliminated; and/or whether the spectrum adjustment scheme(s) meets a pre-entered constraint condition can also be determined, and spectrum adjustment scheme(s) that does not meet the constraint condition can be eliminated. Reference for the constraint condition can be made to the relevant description above.

In the case where there are a plurality of retained spectrum adjustment schemes, index evaluation can be performed on the retained spectrum adjustment schemes. The evaluated index can include an amount of the to-be-adjusted second wavelength channel(s) and/or a sum of to-be-adjusted frequency/frequencies of the to-be-adjusted second wavelength channel(s), involved in the spectrum adjustment scheme. The sum of the to-be-adjusted frequency/frequencies may refer to a sum of to-be-adjusted value(s) of laser frequency/frequencies.

An index evaluation result can serve as auxiliary decision-making information for selecting the spectrum adjustment scheme, that is, a spectrum adjustment scheme can be selected from the retained spectrum adjustment schemes based on the index evaluation result. For example, the index evaluation result can be provided to a user, and the user selects a spectrum adjustment scheme from the retained spectrum adjustment schemes according to the index evaluation result to serve as a final spectrum adjustment scheme.

Figure 2:
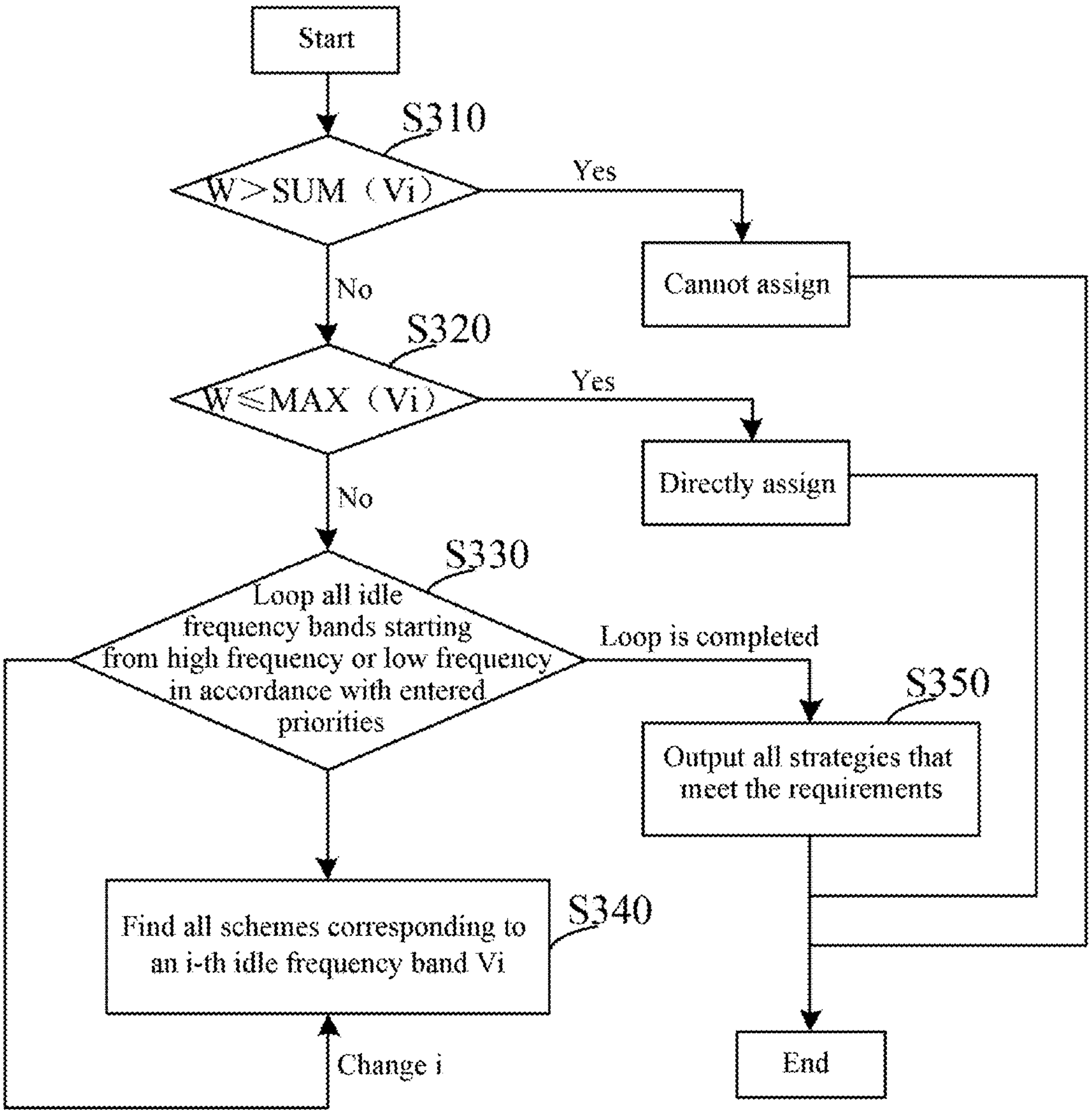
FIG. 2 shows an overall schematic flowchart of generating a spectrum adjustment scheme according to an embodiment of the present disclosure.

FIG. 2 shows an overall schematic flowchart of generating a spectrum adjustment scheme according to an embodiment of the present disclosure.

As shown in FIG. 2, step S310 can be executed first to determine whether W>SUM (Vi) holds. W represents a spectrum width of a requested new channel (i.e., the first wavelength channel). SUM (Vi) represents a sum of spectrum widths of remaining idle channels. In the present disclosure, the concept of spectrum is equivalent to the concept of frequency band. The optimizing of spectrum resources can also be understood as the optimizing of frequency band resources. The spectrum width is the frequency band width.

If W>SUM (Vi) holds, it means that assignation cannot be made and the spectrum adjustment scheme generation process can be finished.

If W>SUM (Vi) does not hold, step S320 can be executed to determine whether W≤MAX (Vi) holds. MAX (Vi) represents a widest idle channel.

If W≤MAX (Vi) holds, an idle channel whose width is greater than the requested width can be directly assigned to the new channel.

If WG≤MAX (Vi) does not hold, step S330 can be executed to loop all idle frequency bands starting from high frequency or low frequency according to the entered priority. After the cycling is completed, step S350 can be executed to output all strategies that meet the bandwidth requirements.

During a cycle, for an i-th idle frequency band (i.e., Vi), step S340 can be executed to find all schemes corresponding to the i-th idle frequency band. The scheme herein refers to a moving strategy of other channels in use (i.e. the second wavelength channel) when the i-th idle frequency band is extended towards low frequency and/or high frequency to enable its width to meet the frequency band width of the requested new channel.

Figure 3:
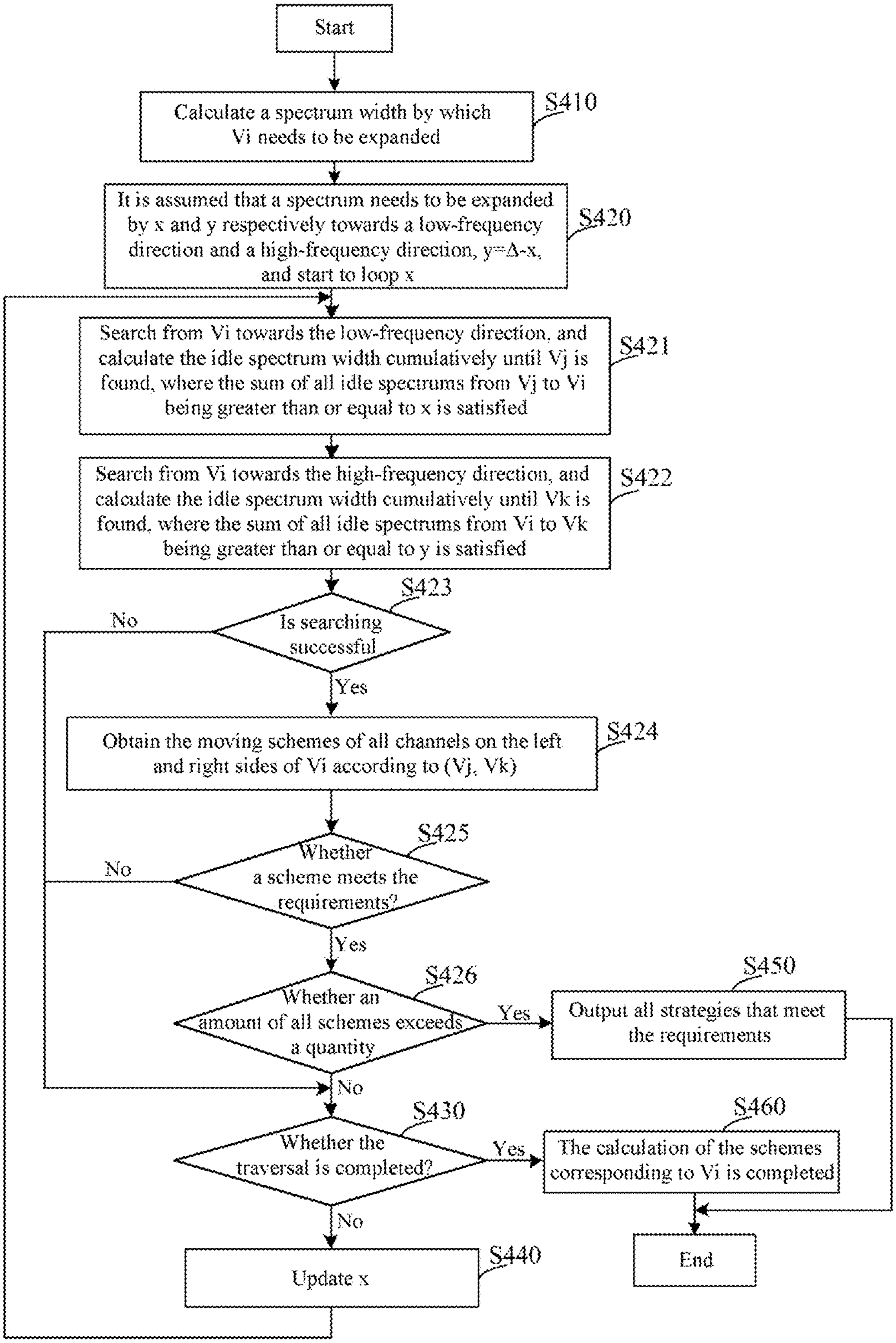
FIG. 3 shows a schematic flowchart of an implementation of step S340 in FIG. 2.

FIG. 3 shows a schematic flowchart of an implementation of step S340 in FIG. 2.

Referring to FIG. 3, in step S410, a spectrum width by which Vi needs to be expanded is calculated.

In step S420, it is assumed that Vi needs to be expanded by x towards a low-frequency direction and by y towards a high-frequency direction, in which y=Δ−x, and start to loop x. Δ represents the spectrum width by which Vi needs to be expanded. Reference for the specific looping flow can be made to steps S421 to S426.

In step S421, search from Vi towards the low-frequency direction, and calculate the idle spectrum width cumulatively until Vj is found, where the sum of the idle spectrums from Vj to Vi being greater than or equal to x is satisfied.

In step S422, search from Vi towards the high-frequency direction, and calculate the idle spectrum width cumulatively until Vk is found, where the sum of the idle spectrums from Vi to Vk being greater than or equal to y is satisfied.

Step S421 and step S422 may be executed at the same time in no particular order, or step S422 may be executed first and then step S421. After the execution of steps S421 and S422 is completed, step S423 may be executed to determine whether the search towards both directions from Vi is successful.

If the search is unsuccessful, it means that the x set in step S420 is not feasible. At this time, step S430 can be executed to determine whether the traversal is completed. If the traversal is not completed, step S440 can be executed to update x, and return to step S421 and step S422 to enable the search procedure for the updated x. If the traversal is completed, a skip to step S460 can be performed, and the calculation of the schemes corresponding to Vi is completed.

If the search is successful, step S424 can be executed, and the moving schemes of all the channels that need to be moved, on the left and right sides of Vi are obtained based on the searched Vj and Vk. Step S425 is then executed to determine whether a scheme meets the bandwidth requirements. If the bandwidth requirements are met, step S426 can be executed to determine whether an amount of all currently generated schemes exceeds a quantity. If the quantity is exceeded, step S450 can be executed to output all strategies that meet the bandwidth requirements. If the quantity is not exceeded, step S440 can be executed to update x, and return to step S421 and step S422 to start the search procedure for the updated x.

Based on the spectrum adjustment scheme generation process, the NMS can provide all spectrum adjustment schemes (i.e., the spectrum adjustment strategy) that meet the bandwidth requirements. After deciding a strategy to be executed from all spectrum adjustment schemes that meet the bandwidth requirements, the NMS can send an adjustment instruction to the transmitting-end and receiving-end device based on the spectrum adjustment scheme, so as to prompt the transmitting-end and receiving-end device to execute the spectrum adjustment scheme.

The Execution of Spectrum Adjustment Scheme

In order to support the implementation solution of the spectrum adjustment scheme of the present disclosure, the electrical-layer device can be configured to provide the capability as follows.

1. Support the largest adjustable range RangeMax of frequency in a light-on state. The adjustable range of frequency range can be symmetrical, and RangeMax needs to be greater than or equal to the minimum channel spacing 12.5 GHz specified in ITUT 694.1.

2. Support a frequency adjustable range CurrentRange in the light-on state in a case of being at a current frequency. CurrentRange can be asymmetric, but the size of the adjustable interval of CurrentRange can be equal to RangeMax.

3. Support cost-free frequency adjustment step Step. The Step herein refers to an absolute value of a difference in configuration values of the center frequencies of the electrical-layer devices at both the transmitting-end and receiving-end, and the performance cost caused by this difference is negligible, for example, less than 0.2 dB. Note that the deviation Step (i.e., a first value mentioned below) of the configuration values of the center frequencies of both electrical-layer devices does not mean that the actual frequency deviation is Step, and it is also necessary to consider an inherent frequency difference of both lasers themselves.

In practice, the configuration of the center frequency can be achieved through different registers. For example, an integer multiple M of a base frequency F can be represented by register A, and a fine-tuning frequency T can be represented by register B. The final center frequency f=M*F+T. The premise herein is that changing the fine-tuning frequency T will not turn off a laser, that is, ensuring frequency adjustment in the light-on state, while modifying the value of register A may cause a laser to turn off.

In order to support the implementation solution of the spectrum adjustment scheme of the present disclosure, the optical-layer device can be configured to provide the capability as follows.

When an FMD device on the optical layer contains a WSS, not only supporting the creation and deletion operations of wavelength channels but also supporting the expansion and contraction of wavelength channels is required, and during the process of expansion and contraction, there is no impact on channel signals in the overlapping part.

Figure 4:
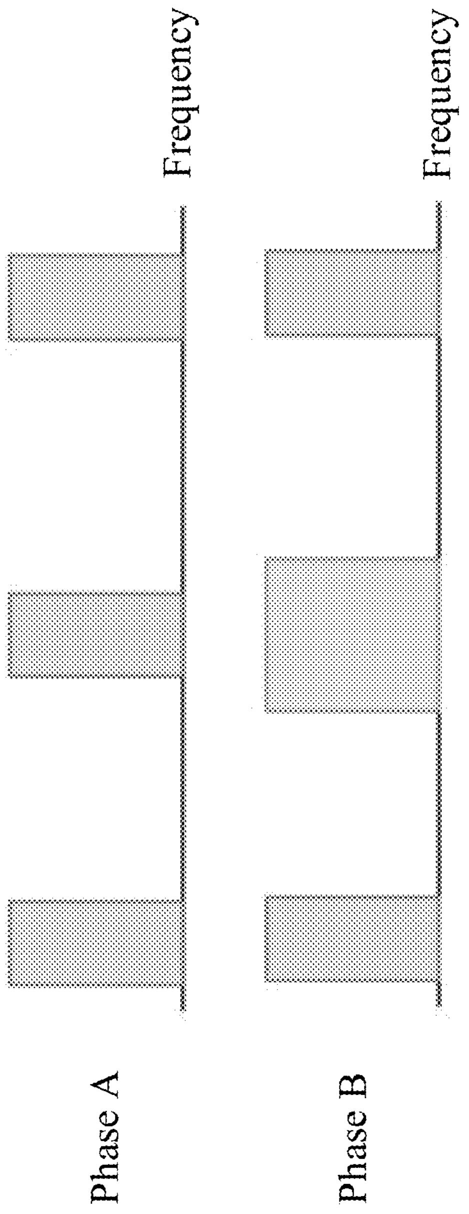
FIG. 4 shows a schematic diagram of a configuration characteristics of a wavelength channel of an optical-layer device.

FIG. 4 shows a schematic diagram of a configuration characteristics of a wavelength channel of an optical-layer device.

As shown in FIG. 4, there are several wavelength channels on a WSS port. From Phase A to Phase B, the middle channel expands. If an original electrical-layer signal is in a center channel in Phase A, then this expansion will not have any impact on the property of the electrical-layer signal. Similarly, from Phase B to Phase A, if the original electrical-layer signal is in the center channel in Phase A, then this contraction will not have any impact on the property of the electrical-layer signal.

As an example, if the frequency band of the adjusted wavelength channel intersects with the frequency band of the pre-adjustment wavelength channel, the working mode of the adjusted wavelength channel can be set to be the same as the working mode of the pre-adjustment wavelength channel. For example, assume that the original wavelength channel is represented as [Min A, Max A], the modified wavelength channel is [Min B, Max B], and the intersection of the two spectrums is [Min K, Max K], where Min K herein is the maximum value between Min A and Min B, and Max K is the minimum value between Max A and Max B. When the spectrum intersection is not empty, the working mode of the channel newly created by WSS can be handled as follows. 1. When the original channel works in an attenuation mode, the new channel still works in attenuation mode, and the loss thereof is consistent with the channel loss in the original state. 2. When the original channel works in a locked power mode, the new channel still works in the locked power mode, and target power values of the original channel remain consistent with those of the new channel.

When the spectrum adjustment scheme is executed, that is, when frequency band(s) of currently used second wavelength channel(s) is adjusted, it is necessary to ensure that the second wavelength channel(s) can still provide normal data transmission services. That is, the spectrum adjustment scheme needs to be implemented without affecting the normal use of the second wavelength channel(s). Based on this consideration, the present disclosure proposes the implementation solution of the spectrum adjustment scheme as follows.

Briefly, the spectrum adjustment scheme can be executed on the transmitting-end and receiving-end device under the control of the NMS.

Specifically, the NMS can first send a first instruction for expanding a frequency band width of the second wavelength channel to the transmitting-end and receiving-end device. The direction of expansion (expanding towards high-frequency or low-frequency) and the width of expansion can be determined according to the spectrum adjustment scheme. As described above in conjunction with FIG. 4, expanding the frequency band width of the second wavelength channel will not affect the use of the second wavelength channel.

In response to receiving a message that the first instruction is executed successfully, the NMS can determine whether a frequency (center frequency) of a laser of the transmitting-end and receiving-end device is a target value. The target value may refer to a value such that the frequencies of optical signals emitted by the lasers in accordance with the target value are all within the frequency range of the adjusted second wavelength channel(s). The specific value of the target value can be determined according to the actual conditions. For example, the target value can refer to a middle value within the frequency range corresponding to the adjusted second wavelength channel.

If the frequency of the laser of the transmitting-end and receiving-end device is not the target value, the NMS can send a second instruction for adjusting laser frequency to the transmitting-end and receiving-end device, to prompt the transmitting-end and receiving-end device to adjust the laser frequency (such as a laser center frequency) to the target value.

If the frequency of the laser of the transmitting-end and receiving-end device is the target value, or after the transmitting-end and receiving-end device adjusts the frequencies of the lasers (such as the center frequencies of the lasers) to the target value, the NMS can then send a third instruction for reducing the frequency band width of the second wavelength channel to a pre-adjustment frequency band width to the transmitting-end and receiving-end device. The transmitting-end and receiving-end device (the optical-layer devices located at the transmitting-end and receiving-end) can realize the adjustment of the frequency band of the second wavelength channel by executing the third instruction. As described above in conjunction with FIG. 4, after the frequency of the laser of the transmitting-end and receiving-end device is adjusted to the target value, reducing the expanded second wavelength channel to the pre-adjustment frequency band width will not affect the use of the second wavelength channel.

During adjusting the frequencies of the lasers in the transmitting-end and receiving-end device, it is necessary to ensure that the difference in laser frequencies of the electrical-layer devices on both the transmitting-end and receiving-end is within an allowable range during the adjustment process, so as not to affect the use of the current second wavelength channel.

To this end, the present disclosure further proposes that the center frequency of the laser in the transmitting-end and receiving-end device can be adjusted to the target value through one or more adjustments, so that the frequency of the optical signal emitted by the respective laser in the transmitting-end and receiving-end device is within the range of the frequency band of the adjusted wavelength channel. The adjustment range of the center frequency of the laser in the transmitting-end and receiving-end device does not exceed the first value in each adjustment process, and a next round of adjustment is performed after both the lasers in the transmitting-end and receiving-end device perform an adjustment.

In other words, the NMS can send multiple rounds of instructions for adjusting the frequencies of the lasers in the transmitting-end and receiving-end device, and the frequencies of the lasers in the transmitting-end and receiving-end device can be adjusted to the target value through multiple rounds of small-scale adjustment. Specifically, the NMS can send the second instruction to a first electrical-layer device located at transmitting-end and a second electrical-layer device located at the receiving-end, of the transmitting-end and receiving-end device respectively, where an adjustment range of the laser frequency characterized by the second instruction does not exceed the first value; after both the first electrical-layer device and the second electrical-layer device have completed the execution of the second instruction, the second instruction is then sent to the first electrical-layer device and the second electrical-layer device respectively again to loop the second instruction sending procedure until both the first electrical-layer device and the second electrical-layer device have been adjusted the frequency of the laser to the target value.

Therefore, based on the implementation solution of the spectrum adjustment scheme of the present disclosure, the entire adjustment process for the second wavelength channel may not affect the normal use of the second wavelength channel.

Figure 5:
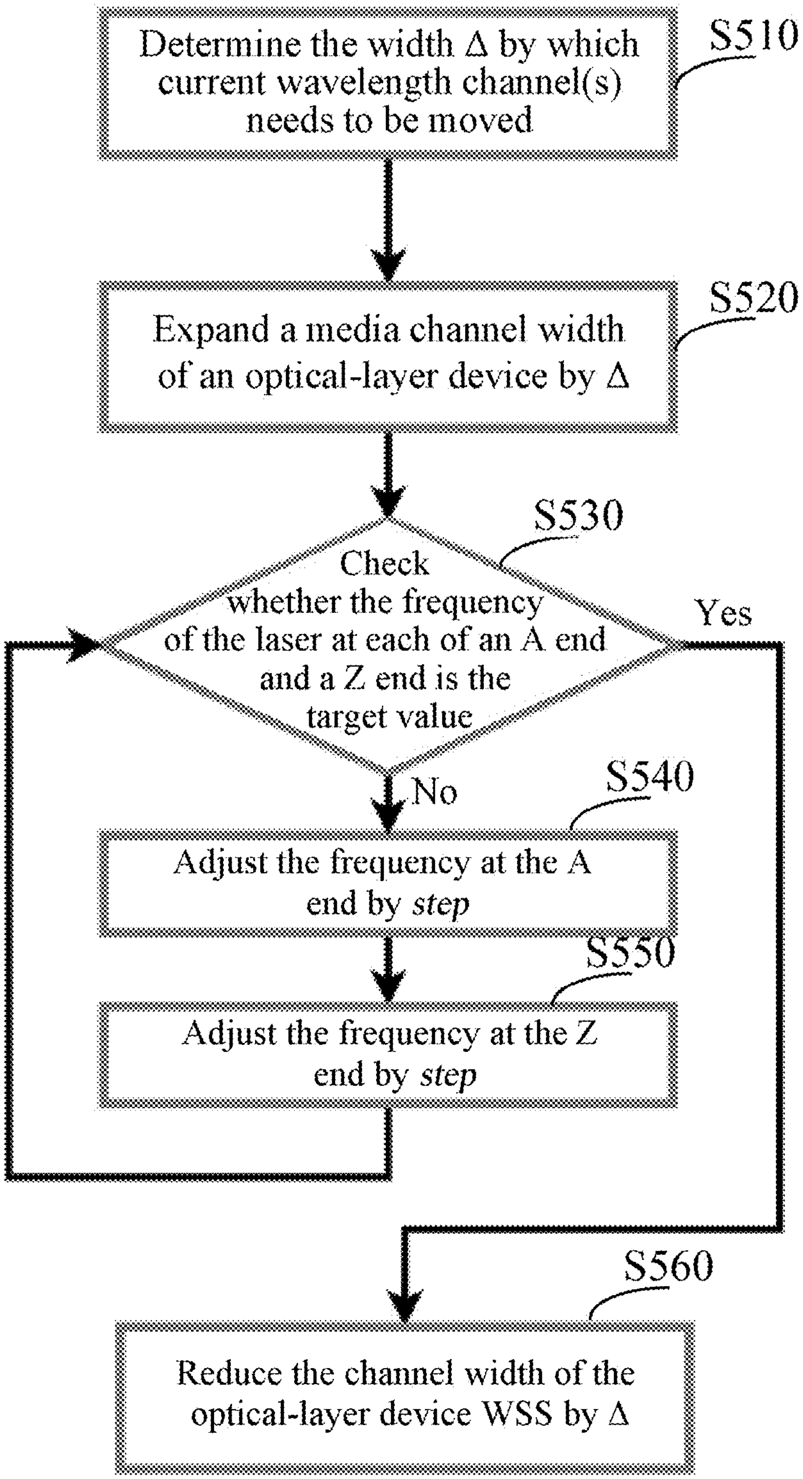
FIG. 5 shows a schematic flowchart of an execution of a spectrum adjustment scheme according to an embodiment of the present disclosure.

FIG. 5 shows a schematic flowchart of an execution of a spectrum adjustment scheme according to an embodiment of the present disclosure.

As shown in FIG. 5, in step S510, first determine the width A by which current wavelength channel(s) (i.e., the second wavelength channel(s)) needs to be moved.

In step S520, expand a wavelength channel width of the corresponding optical-layer device by Δ.

In step S530, check whether the frequency of the laser of the transmitting-end and receiving-end (i.e., A end and Z end) is the target value.

If the laser frequency is not the target value, step S540 and step S550 are executed to adjust the frequencies of the lasers at the A end and Z end by step respectively. One adjustment process of the laser frequency includes step S540 and step S550. For the electrical layer devices at the transmitting-end and the receiving-end, the size of each frequency adjustment does not exceed step (i.e., the first value mentioned above). Instructions to the two devices at the transmitting-end and receiving-end can be sent in parallel, but the next round of adjustment cannot not be started unless it is confirmed that both devices have complete the frequency adjustment by step.

In step S560, reduce the channel width of the optical-layer device WSS by Δ.

It should be noted that there are typically two or more optical-layer devices including WSS. When there are two or more optical-layer devices that need to adjust the wavelength channel, the adjustment instruction for the wavelength channel (i.e., the first instruction or the third instruction) can be sent in parallel or serially.

Through the method proposed in the present disclosure of first expanding the channel width, moving the electrical-layer frequency, and then reducing the channel width after moving the electrical-layer frequency in place, the execution process of the spectrum adjustment scheme may not affect the normal use of the wavelength channel.

During the execution of the spectrum adjustment scheme, an abnormality may occur due to various reasons. The abnormality herein may include a command not being sent successfully, optical-layer media channel expanding adjustment failure, optical-layer media channel contracting adjustment failure, electrical-layer laser frequency adjustment failure, etc. For these abnormalities, the handling manners can all be to jump out of the whole spectrum adjustment procedure and report information, including steps that have been completed and steps that have been failed, for manual participation in solving.

The spectrum adjustment method of the present disclosure (including the generation of the spectrum adjustment scheme and the execution of the spectrum adjustment scheme) can be used in complete systems (including electrical layer, optical layer, and network management controller) provided by traditional system manufacturers, and can also be applied to a heterogeneous decoupled network (electrical-layer device, optical-layer device, and network management controller can come from different suppliers).

Figure 6:
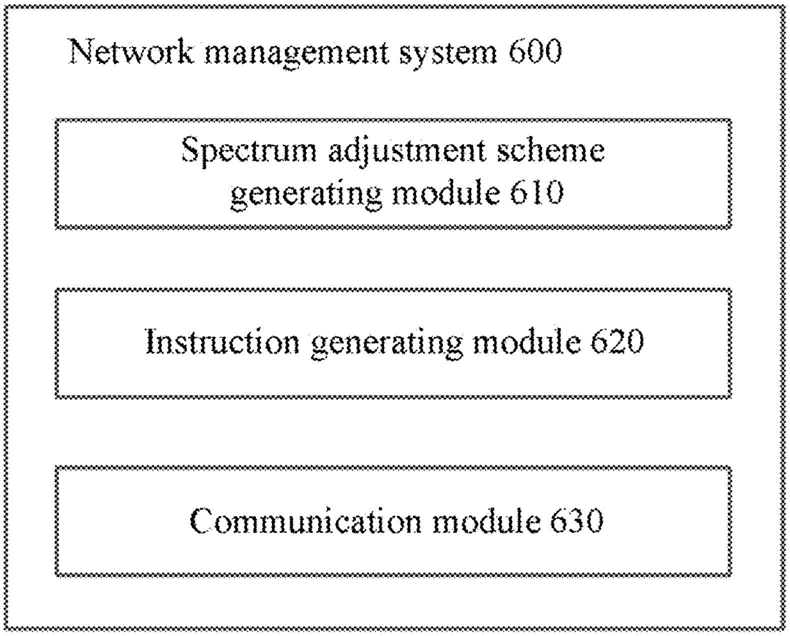
FIG. 6 shows a schematic structural diagram of a network management system according to an embodiment of the present disclosure.

FIG. 6 shows a schematic structural diagram of a network management system according to an embodiment of the present disclosure.

Referring to FIG. 6, a network management system 600 can include a spectrum adjustment scheme generating module 610, an instruction generating module 620 and a communication module 630.

The spectrum adjustment scheme generating module 610 is configured to: take a goal of providing at least one available idle frequency band for a first wavelength channel desired to be created, generate a spectrum adjustment scheme based on frequency band information of a second wavelength channel currently used by a transmitting-end and receiving-end device corresponding to the first wavelength channel in an optical transmission system, where the spectrum adjustment scheme is used to characterize frequency band adjustment information of a second wavelength channel that needs to be adjusted.

The instruction generating module 620 is configured to generate an adjustment instruction for execution by the transmitting-end and receiving-end device based on the spectrum adjustment scheme.

The communication module 630 is configured to send the adjustment instruction to the transmitting-end and receiving-end device.

Reference for the generation process of the spectrum adjustment scheme and the instruction sending process can be made to in the relevant description above.

Figure 7:
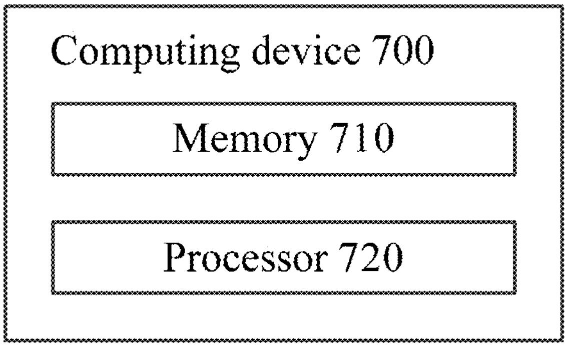
FIG. 7 shows a schematic structural diagram of a computing device according to an embodiment of the present disclosure.

FIG. 7 shows a schematic structural diagram of a computing device according to an embodiment of the present disclosure.

Referring to FIG. 7, a computing device 700 includes a memory 710 and a processor 720.

The processor 720 may be a multi-core processor or may include a plurality of processors. In some embodiments, the processor 720 can include a general main processor and one or more special co-processors, such as a graphics processing unit (GPU), a digital signal processor (DSP), and the like. In some embodiments, the processor 720 may be implemented using customized circuits, such as application specific integrated circuits (ASIC) or field programmable gate arrays (FPGA).

The memory 710 can include various types of storage units, such as a system memory, a read-only memory (ROM), and persistent storage. The ROM can store static data or instructions required by the processor 720 or other modules of a computer. The persistent storage may be a readable and writable storage apparatus. The persistent storage may be a non-volatile storage device that does not lose stored instructions and data even when the computer is powered off. In some implementations, the persistent storage uses a large-capacity storage (e.g., magnetic or optical disk, flash memory) as the persistent storage. In other implementations, the persistent storage may be a removable storage device (e.g., floppy disk, or CD driver). The system memory may be a readable and writeable storage device or a volatile readable and writeable storage device, such as a dynamic random access memory. The system memory can store some or all of the instructions and data required when the processor runs. In addition, the memory 710 may include any combination of computer-readable storage media, including various types of semiconductor memory chips (DRAM (Dynamic Random Access Memory), SRAM (Static Random Access Memory), SDRAM (Synchronous Dynamic random access memory), flash memory, programmable read-only memory), and magnetic disks and/or optical disks may also be used. In some implementations, the memory 710 may include a readable and/or writable removable storage device, such as a compact disc (CD), a read-only digital versatile disc (e.g., DVD (Digital Video Disk)-ROM, dual-layer DVD-ROM), a Blu-ray Disc Read-Only memory, an ultra-density optical, a flash card (such as an SD (Secure Digital) card, a min SD card, a Micro-SD card, and so on), a magnetic floppy disk, and so on. The computer-readable storage media do not contain transient electronic signals that are transmitted wirelessly or wired and carrier waves.

The memory 710 stores thereon executable codes which, when processed by the processor 720, enables the processor 720 to perform the spectrum adjustment method for the optical transmission system mentioned above.

A spectrum adjustment method for an optical transmission system and a network management system, and a device according to the present disclosure have been described in detail above with reference to the accompanying drawings.

In addition, the methods according to the present disclosure can also be implemented as a computer program or a computer program product, which includes computer program code instructions for executing the steps defined in the methods of the present disclosure.

Alternatively, the present disclosure can also be implemented as a non-transitory machine-readable storage medium (or computer-readable storage medium, or machine-readable storage medium) storing thereon executable codes (or a computer program, or computer instruction codes). When the executable codes (or the computer program, or computer instruction codes) are executed by a processor of an electronic device (or a computing device, a server, and so on), the processor is enabled to execute each step of the methods according to the present disclosure.

Those of skill would further understand that the various illustrative logical blocks, modules, circuits, and algorithm steps described in connection with the disclosure herein can be implemented as electronic hardware, computer software, or combinations thereof.

The flowcharts and block diagrams in the drawings illustrate the architectures, functions, and operations of possible implementations of systems and methods according to a plurality of embodiments of the present disclosure. In this regard, each block in the flowcharts or block diagrams can represent a module, a program segment, or a part of codes that contain one or more executable instructions for implementing a specified logical function. It should also be noted that, in some alternative implementations, a function noted in a block can occur in an order different from that noted in the drawings. For example, two consecutive blocks can actually be executed substantially in parallel, or they can sometimes be executed in the reverse order, which depends on the functionality involved. It can also be noted that each block of the block diagrams and/or flowcharts, and a combination of blocks in the block diagrams and/or flowcharts, can be implemented by special-purpose hardware-based systems that perform the specified functions or operations or can be implemented using a combination of special-purpose hardware and computer instructions.

The embodiments of the present disclosure have been described above. The above description is illustrative, not exhaustive, and is not limited to the disclosed embodiments. Many modifications and variations are apparent to those skilled in the art without departing from the scope and spirit of the illustrated embodiments. The selection of terminology used herein is intended to best explain the principles, practical applications, or improvements to the technologies in the market of the embodiments, or to enable other persons of ordinary skill in the art to understand the embodiments disclosed herein.

The invention claimed is:

1. A spectrum adjustment method for an optical transmission system, comprising:

taking a goal of providing at least one available idle frequency band for a first wavelength channel desired to be created, generating a spectrum adjustment scheme based on frequency band information of a second wavelength channel currently used by a transmitting-end and receiving-end device corresponding to the first wavelength channel in the optical transmission system, wherein the spectrum adjustment scheme is used to characterize frequency band adjustment information of a second wavelength channel that needs to be adjusted;

sending an adjustment instruction to the transmitting-end and receiving-end device based on the spectrum adjustment scheme, wherein the step of generating the spectrum adjustment scheme comprises:

determining whether a frequency band width of the first wavelength channel is greater than a sum of widths of all unused frequency bands;

if the frequency band width of the first wavelength channel is less than or equal to the sum of the widths of all the unused frequency bands, determining whether the frequency band width of the first wavelength channel is less than or equal to a largest frequency band width of the unused frequency bands;

if the frequency band width of the first wavelength channel is greater than the largest frequency band width of the unused frequency bands, for each frequency band in at least part of the unused frequency bands, taking a goal of expanding the respective frequency band to a frequency band of the first wavelength channel, generating the spectrum adjustment scheme corresponding to the respective frequency band.

2. The method according to claim 1, further comprising:

determining feasibility of the spectrum adjustment scheme based on an adjustment capability of the transmitting-end and receiving-end device, and eliminating an unfeasible spectrum adjustment scheme; and/or determining whether the spectrum adjustment scheme meets a pre-entered constraint condition, and eliminating a spectrum adjustment scheme that does not meet the constraint condition.

3. The method according to claim 2, further comprising:

performing index evaluation on a retained spectrum adjustment scheme, wherein an evaluated index comprises an amount of the to-be-adjusted second wavelength channel and/or a sum of a to-be-adjusted frequency of the to-be-adjusted second wavelength channel involved in the retained spectrum adjustment scheme;

selecting a spectrum adjustment scheme from the retained spectrum adjustment scheme based on an index evaluation result.

4. The method according to claim 1, further comprising:

obtaining intention information, wherein the intention information comprises at least one of identification information of the transmitting-end and receiving-end device, a transmission rate of the first wavelength channel, and a frequency band width of the first wavelength channel; and/or obtaining constraint information, wherein the constraint information comprises at least one of a frequency band interval of the first wavelength channel, a priority of a frequency band where the first wavelength channel is located, a maximum value of a frequency band of the to-be-adjusted second wavelength channel involved in the spectrum adjustment scheme, a maximum frequency value of an adjustment step involved when the spectrum adjustment scheme is executed, and an adjustment range of a center frequency of a laser of the transmitting-end and receiving-end device;

wherein the step of generating the spectrum adjustment scheme comprises: generating the spectrum adjustment scheme based on the frequency band information of the second wavelength channel currently used by the transmitting-end and receiving-end device, the intention information and/or the constraint information.

5. The method according to claim 1, wherein the step of sending the adjustment instruction to the transmitting-end and receiving-end device based on the spectrum adjustment scheme comprises:

sending a first instruction for expanding a frequency band width of the second wavelength channel to the transmitting-end and receiving-end device;

in response to receiving a message that the first instruction is executed successfully, sending a second instruction for adjusting a laser frequency to the transmitting-end and receiving-end device to prompt the transmitting-end and receiving-end device to adjust the laser frequency to a target value; and sending a third instruction for reducing the frequency band width of the second wavelength channel to a pre-adjustment frequency band width to the transmitting-end and receiving-end device after the transmitting-end and receiving-end device adjust the laser frequency to the target value.

6. The method according to claim 5, wherein the step of sending the second instruction for adjusting the laser frequency to the transmitting-end and receiving-end device comprises:

sending the second instruction to a first electrical-layer device located at a transmitting-end and a second electrical-layer device located at a receiving-end, of the transmitting-end and receiving-end device respectively, wherein an adjustment range of the laser frequency characterized by the second instruction does not exceed a first value;

sending, after both the first electrical-layer device and the second electrical-layer device have executed the second instruction, the second instruction to the first electrical-layer device and the second electrical-layer device respectively again until both the first electrical-layer device and the second electrical-layer device have the laser frequency adjusted to the target value.

7. A spectrum adjustment method for an optical transmission system, comprising:

expanding a frequency band width of a wavelength channel currently used, based on frequency band adjustment information of the wavelength channel that is characterized by a spectrum adjustment scheme;

adjusting a laser frequency in a transmitting-end and receiving-end device corresponding to the wavelength channel so that a frequency of an optical signal emitted by an adjusted laser is within a frequency band range of the adjusted wavelength channel; and reducing the frequency band width of the wavelength channel to a pre-adjustment frequency band width, wherein the step of adjusting the laser frequency in the transmitting-end and receiving-end device corresponding to the wavelength channel comprises:

adjusting the laser frequency in the transmitting-end and receiving-end device to a target value through one or more adjustments, so that the frequency of the optical signal emitted by the respective laser in the transmitting-end and receiving-end device is within the frequency band range of the adjusted wavelength channel, wherein an adjustment range of a center frequency of a laser in the transmitting-end and receiving-end device in each adjustment process does not exceed a first value, and a next round of adjustment is performed after both of a first electrical-layer device located at a transmitting-end and a second electrical-layer device located at a receiving-end, of the transmitting-end and receiving-end device perform an adjustment of the laser frequency.

8. A network management system, comprising a spectrum adjustment scheme generating device, an instruction generating device, and a communication device, wherein the spectrum adjustment scheme generating device is configured to: take a goal of providing at least one available idle frequency band for a first wavelength channel desired to be created, generate a spectrum adjustment scheme based on frequency band information of a second wavelength channel currently used by a transmitting-end and receiving-end device corresponding to the first wavelength channel in an optical transmission system, wherein the spectrum adjustment scheme is used to characterize frequency band adjustment information of a second wavelength channel that needs to be adjusted;

the instruction generating device is configured to generate an adjustment instruction for execution by the transmitting-end and receiving-end device based on the spectrum adjustment scheme;

the communication device is configured to send the adjustment instruction to the transmitting-end and receiving-end device, wherein the step of generating the spectrum adjustment scheme comprises:

determining whether a frequency band width of the first wavelength channel is greater than a sum of widths of all unused frequency bands;

if the frequency band width of the first wavelength channel is less than or equal to the sum of the widths of all the unused frequency bands, determining whether the frequency band width of the first wavelength channel is less than or equal to a largest frequency band width of the unused frequency bands;

if the frequency band width of the first wavelength channel is greater than the largest frequency band width of the unused frequency bands, for each frequency band in at least part of the unused frequency bands, taking a goal of expanding the respective frequency band to a frequency band of the first wavelength channel, generating the spectrum adjustment scheme corresponding to the respective frequency band.

9. A computing device, comprising:

a processor; and a memory, which stores thereon executable codes, wherein when the executable codes are executed by the processor, the processor is caused to execute the method according to claim 1.

10. A non-transitory machine-readable storage medium, which stores thereon executable codes, wherein when the executable codes are executed by a processor of an electronic device, the processor is caused to execute the method according to claim 1.

11. The computing device according to claim 9, wherein the processor is further caused to:

determine feasibility of the spectrum adjustment scheme based on an adjustment capability of the transmitting-end and receiving-end device, and eliminate an unfeasible spectrum adjustment scheme; and/or determine whether the spectrum adjustment scheme meets a pre-entered constraint condition, and eliminate a spectrum adjustment scheme that does not meet the constraint condition.

12. The computing device according to claim 11, wherein the processor is further caused to:

perform index evaluation on a retained spectrum adjustment scheme, wherein an evaluated index comprises an amount of the to-be-adjusted second wavelength channel and/or a sum of a to-be-adjusted frequency of the to-be-adjusted second wavelength channel involved in the retained spectrum adjustment scheme;

select a spectrum adjustment scheme from the retained spectrum adjustment scheme based on an index evaluation result.

13. The computing device according to claim 9, wherein the processor is further caused to:

obtain intention information, wherein the intention information comprises at least one of identification information of the transmitting-end and receiving-end device, a transmission rate of the first wavelength channel, and a frequency band width of the first wavelength channel; and/or obtain constraint information, wherein the constraint information comprises at least one of a frequency band interval of the first wavelength channel, a priority of a frequency band where the first wavelength channel is located, a maximum value of a frequency band of the to-be-adjusted second wavelength channel involved in the spectrum adjustment scheme, a maximum frequency value of an adjustment step involved when the spectrum adjustment scheme is executed, and an adjustment range of a center frequency of a laser of the transmitting-end and receiving-end device;

generate the spectrum adjustment scheme based on the frequency band information of the second wavelength channel currently used by the transmitting-end and receiving-end device, the intention information and/or the constraint information.

14. The computing device according to claim 9, wherein the processor is further caused to:

send a first instruction for expanding a frequency band width of the second wavelength channel to the transmitting-end and receiving-end device;

in response to receiving a message that the first instruction is executed successfully, send a second instruction for adjusting a laser frequency to the transmitting-end and receiving-end device to prompt the transmitting-end and receiving-end device to adjust the laser frequency to a target value; and send a third instruction for reducing the frequency band width of the second wavelength channel to a pre-adjustment frequency band width to the transmitting-end and receiving-end device after the transmitting-end and receiving-end device adjust the laser frequency to the target value.

15. The computing device according to claim 14, wherein the processor is further caused to:

send the second instruction to a first electrical-layer device located at a transmitting-end and a second electrical-layer device located at a receiving-end, of the transmitting-end and receiving-end device respectively, wherein an adjustment range of the laser frequency characterized by the second instruction does not exceed a first value;

send, after both the first electrical-layer device and the second electrical-layer device have executed the second instruction, the second instruction to the first electrical-layer device and the second electrical-layer device respectively again until both the first electrical-layer device and the second electrical-layer device have the laser frequency adjusted to the target value.

16. A computing device, comprising:

a processor; and a memory, which stores thereon executable codes, wherein when the executable codes are executed by the processor, the processor is caused to execute the method according to claim 7.

* * * * *